(12) United States Patent
Hacker

(10) Patent No.: US 8,434,991 B1
(45) Date of Patent: May 7, 2013

(54) VEHICLE-MOUNTED CONTAINER LIFT

(76) Inventor: William Shawn Hacker, American Canyon, CA (US)

(*) Notice: Subject to any disclaimer, the term of this patent is extended or adjusted under 35 U.S.C. 154(b) by 363 days.

(21) Appl. No.: 12/804,350

(22) Filed: Jul. 20, 2010

(51) Int. Cl.
*B60P 1/00* (2006.01)

(52) U.S. Cl.
USPC .......................................... 414/544; 414/542

(58) Field of Classification Search .................. 414/468, 414/499, 500, 539, 540, 541, 545, 546, 549, 414/555, 341, 446, 455, 456, 467, 475, 476, 414/477, 480, 481, 491, 495, 496, 498, 542, 414/544, 547, 558, 584, 678, 812; 280/656, 280/638, 657, 769
See application file for complete search history.

(56) References Cited

U.S. PATENT DOCUMENTS

| | | | |
|---|---|---|---|
| 3,235,105 A * | 2/1966 | Loomis | 414/544 |
| 4,049,143 A * | 9/1977 | Hatakka et al. | 414/458 |
| 5,082,417 A * | 1/1992 | Vlaanderen | 414/498 |
| 5,803,699 A * | 9/1998 | Pinkston | 414/498 |
| 5,984,614 A * | 11/1999 | Weber | 414/498 |
| 6,071,062 A | 6/2000 | Warhurst et al. | |
| 6,155,770 A | 12/2000 | Warhurst | |
| 6,231,294 B1 * | 5/2001 | Young et al. | 414/563 |
| 6,817,820 B2 * | 11/2004 | Ackerman et al. | 414/25 |
| 7,037,062 B2 * | 5/2006 | Oliver | 414/478 |
| 7,264,437 B2 * | 9/2007 | Lockamy et al. | 414/812 |
| 8,070,414 B2 * | 12/2011 | Tuel et al. | 414/812 |
| 8,070,415 B2 * | 12/2011 | Tuel et al. | 414/812 |
| 2005/0156407 A1 * | 7/2005 | Granlind | 280/656 |
| 2007/0071586 A1 * | 3/2007 | Born et al. | 414/549 |
| 2007/0292250 A1 * | 12/2007 | Born et al. | 414/467 |

* cited by examiner

*Primary Examiner* — Saul Rodriguez
*Assistant Examiner* — Glenn Myers
(74) *Attorney, Agent, or Firm* — Loyal McKinley Hanson

(57) ABSTRACT

An apparatus for loading a container (e.g., a 16-foot container or other storage box) onto a truck, trailer, or other vehicle, includes first and second container-engaging beams (e.g. 20-foot long steel tubes) mounted on the vehicle in longitudinally extending, laterally spaced-apart, horizontal positions so that an operator can deploy the beams rearwardly of the vehicle, engage the container with them, and then lift and withdraw the beams with the container onto the vehicle. Beam-holding components on the vehicle hold the proximal end portions of the beams forward of the vehicle's rearward end for hydraulically powered, operator-controlled movement vertically, laterally, and longitudinally. Beam-supporting components at the rearward end of the truck support the intermediate portions of the beams immediately rearward of the vehicle's rearward end for operator-controlled movement of the intermediate portions vertically and laterally in concert with movement of the proximal end portions in order to achieve desired beam orientations for container-loading purposes.

9 Claims, 9 Drawing Sheets

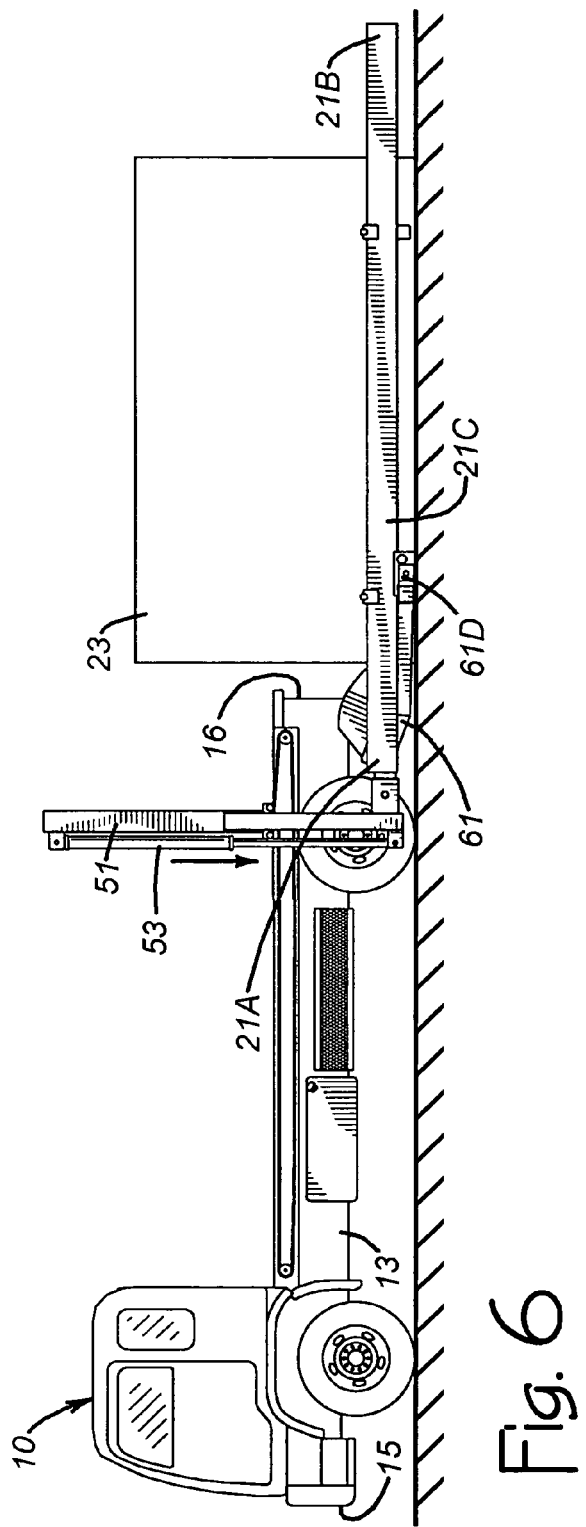
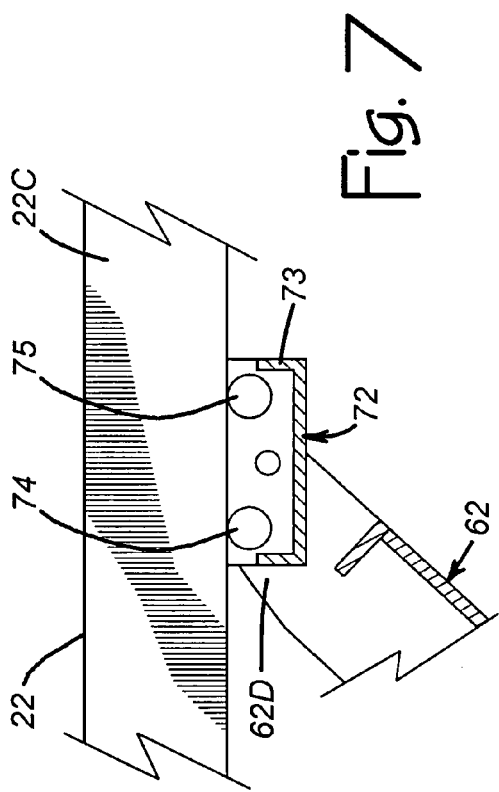

VEHICLE-MOUNTED CONTAINER LIFT

BACKGROUND OF THE INVENTION

1. Technical Field

This invention relates generally to the transportation industry, and more particularly to a vehicle-mounted, container-lifting apparatus for loading a container onto a truck, trailer, or other vehicle, and thereafter supporting the container in transit and unloading it when desired.

2. Description of Related Art

A "vehicle-mounted container lift" herein is a lifting apparatus mounted on a truck, trailer, or other such wheeled vehicle for over-the-road use. It functions as means for loading and unloading a container onto and from the vehicle. Such a lifting apparatus may, for example, include container-engaging components powered by operator-controlled hydraulics suitable for loading containers weighing up to about four to five tons (e.g., an eight-by-eight by sixteen-foot long storage box). The container size, vehicle size, and various vehicle-related laws and regulations combine with operational, manufacturing, and cost considerations to affect the precise way in which such a vehicle-mounted container lift is configured.

U.S. Pat. No. 6,071,062 describes an apparatus for lifting, handling, and transporting a container on a vehicle that includes a carrier frame on wheels. An operator can deploy and retract the carrier frame hydraulically to and from the vehicle platform while expanding and contracting it transversely in order to clear the vehicle and engage the container. With the wheels deployed and the carrier frame engaging the container, the carrier frame hydraulically lifts the container and then wheels the container on the surface supporting the vehicle until the container is in position over the vehicle platform. The container is thereafter lowered onto the vehicle platform and the wheels of the apparatus are retracted for transport.

U.S. Patent Publication No. 2007/0071586 describes a system for loading, handling, and transporting containers on a truck that uses relatively short left and right container-engaging beams called "cradle assemblies" for holding opposite sides of a container. A hydraulically powered dolly mounted moveably on the truck includes crane-like "yoke arms" that extend rearwardly from the dolly on left and right sides of the truck to distal ends of the yoke arms on which the cradle assemblies are mounted rotatably. The yoke arms lift the cradle assemblies while hydraulic components rotate the cradle assemblies on the distal ends of the yoke arms in order to keep the cradle assemblies and the container level.

Although the above vehicle-mounted container lifts provide hydraulically powered lifting designed to keep the container somewhat level as it is loaded and unloaded from the vehicle, there are various drawbacks that need to be overcome. Thus, a need exists for a better vehicle-mounted container-lifting apparatus

SUMMARY OF THE INVENTION

In view of the foregoing, it is an object of the present invention to provide a vehicle-mounted, container-lifting apparatus that alleviates various drawbacks of the prior art. The present invention achieves this objective by providing an apparatus for lifting and carrying a container on two parallel beams that keep the container level during loading. The two beams are hydraulically powered, horizontally disposed, container-engaging beams mounted moveably on the vehicle in spaced-apart parallel positions. An operator moves the hydraulically powered beams rearwardly and downwardly into engagement of a container located behind the vehicle, and then lifts and carries the container with the beams back onto the vehicle.

Instead of holding both ends of both beams, however, a beam-holding assembly is provided on the vehicle that holds the proximal end portions of the beams while a beam-supporting assembly supports the intermediate portions. The beam-holding assembly holds the proximal end portions of the beams forward of the vehicle's rearward end, while the beam-supporting assembly supports the intermediate portions of the beams just rearward of the vehicle's rearward end. The beams are held and supported that way moveably, so that the operator can hydraulically control movement of the intermediate portions in concert with movement of the proximal end portions in order to achieve desired beam orientations for container-loading purposes.

To paraphrase some of the more precise language appearing in the claims and further introduce the nomenclature used, the present invention provides an apparatus for loading a container onto a vehicle having a forward end, a rearward end, and a central axis extending horizontally from the forward end to the rearward end. The apparatus includes first and second container-engaging means for engaging first and second opposite sides of the container, said means including two spaced-apart container-engaging beams mounted moveably on the vehicle. The first beam has a first proximal end portion, a first distal end portion, and a first intermediate portion extending intermediate the first proximal end portion and the first distal end portion along a first beam axis of elongation. Similarly, the second beam has a second proximal end portion, a second distal end, and a second intermediate portion extending intermediate the second proximal end portion and the second distal end portion along a second beam axis of elongation.

The apparatus includes beam-holding means on the vehicle for holding the first and second proximal end portions of the first and second beams forward of the rearward end of the vehicle for operator-controlled movement of the first and second proximal end portions vertically, laterally, and longitudinally. That is done with the first beam axis of elongation disposed horizontally to the left of and parallel to a vertical reference plane containing the central axis and the second beam axis of elongation disposed horizontally to the right of and parallel to the vertical reference plane. One embodiment does so with two spaced-apart, hydraulically powered, telescoping, vertically adjustable post assemblies that are connected to a longitudinally moveable carrier assembly by a hydraulically powered, telescoping, laterally adjustable cross-arm assembly. The carrier assembly is a moveable platform riding on rollers atop two spaced-apart rails on the vehicle that extend parallel to the central axis. The laterally adjustable cross-arm arrangement is mounted on the carrier assembly where it extends transversely across and perpendicular to the vertical reference plane. The vertically adjustable posts extend vertically from opposite ends of the cross-arm arrangement, and the proximal end portions of the beams are connected to lower end portions of the vertically adjustable posts.

In addition to holding the proximal end portions of the beams ahead of the vehicle's rearward end, the apparatus supports the intermediate portions immediately behind the vehicle (i.e., rearward of the vehicle's rearward end up to a maximum of about ten feet or so). For that purpose, the apparatus includes beam-supporting means on the vehicle for supporting the first and second intermediate portions of the first and second beams rearward of the rearward end of the vehicle. The beam-supporting means supports the intermediate portions of the beams while enabling operator-controlled positioning of the intermediate portions vertically and laterally in concert with movement of the proximal end portions in order to achieve operator-desired beam orientations for container-loading purposes.

Preferably, the beam-supporting means includes first and second spaced-apart, rearwardly extending, beam-supporting arms on the rearward end of the vehicle, with the first beam-supporting arm located to the left of the vertical reference plane containing the central axis and the second beam-supporting arm located to the right of the vertical reference plane. The first beam-supporting arm has a first arm proximal end portion mounted pivotally on the vehicle and a first arm distal end portion connected slidably to the intermediate portion of the first beam. Similarly, the second beam-supporting arm has a second arm proximal end portion mounted pivotally on the vehicle and a second arm distal end portion connected slidably to the intermediate portion of the second beam. Operator-controlled hydraulics move the first and second beam-supporting arms laterally and pivotally so that the first arm and second arm distal end portions of the first and second beam-supporting arms move vertically and laterally while sliding along the beams longitudinally in order to thereby support the intermediate portions of the first and second beams as desired while maintaining the beams parallel during beam deployment and retraction.

Thus, the invention provides a vehicle-mounted, container-lifting apparatus that holds two spaced-apart container-engaging beams on the vehicle by their proximal end portions while providing support for the beams immediately behind the vehicle with the two adjustable beam-supporting arms. Operator-controlled hydraulics moves the proximal end portions of the beams laterally, vertically, and longitudinally while moving the beam-supporting arms laterally and pivotally at the rearward end of the vehicle in order to thereby support the beams and maintain beam orientations parallel and level during container loading and unloading. The following detailed description taken with the accompanying drawings make the foregoing and other objects, features, and advantages of the invention more apparent.

BRIEF DESCRIPTION OF THE DRAWINGS

FIG. 6 is a side elevation of the truck and container-lifting apparatus that is similar to FIG. 4, but with the beam-supporting arms and the container-engaging beams lowered in preparation for engaging the container;

FIG. 7 is an enlarged detail view of a portion of the first beam-supporting arm, with portions in cross section as viewed in a vertical cross-section plane parallel to the central axis that contains a line 7-7 in FIG. 2;

DESCRIPTION OF THE PREFERRED EMBODIMENTS

Figure 1:
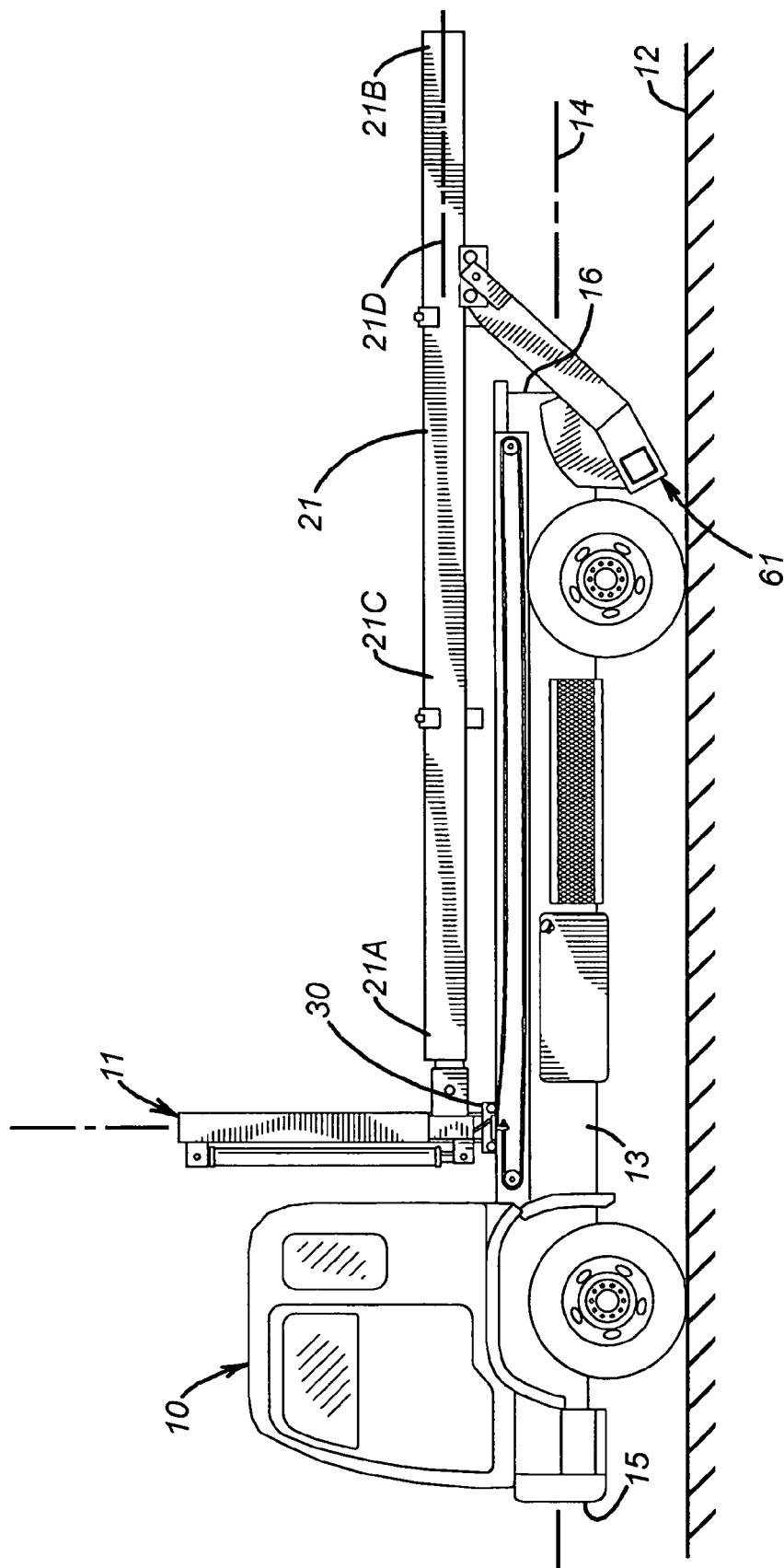
FIG. 1 of the drawings is a side elevation view of the left side of a truck on which is mounted a container-lifting apparatus constructed according to the invention, with the apparatus shown retracted onto the truck.
Figure 2:
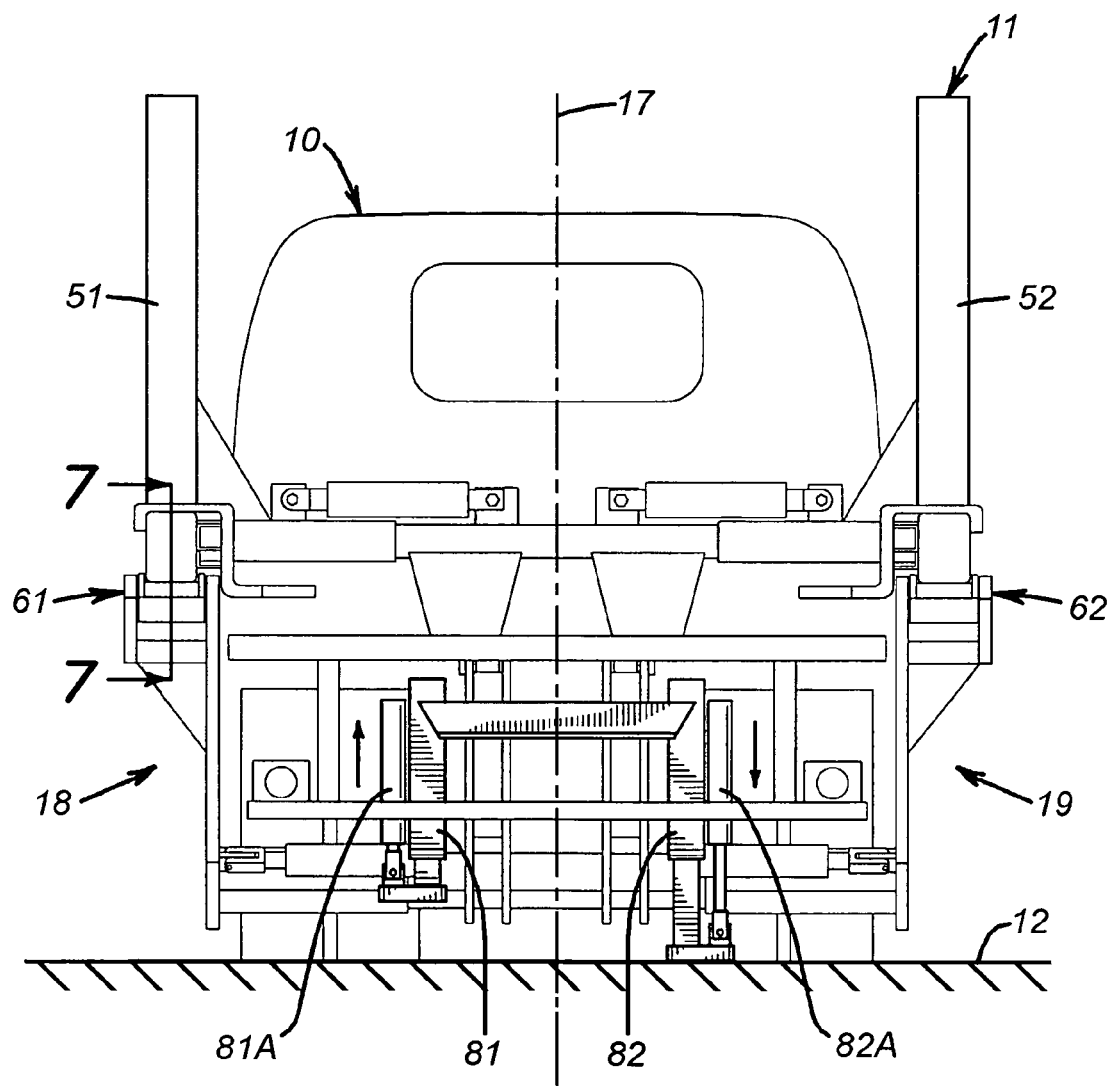
FIG. 2 of the drawings is a rear elevation view of the truck and container-lifting apparatus that focuses on the outriggers at the rearward end of the truck along with identifying a vertical reference plane containing the central axis for use in describing various spatial relationships.

FIG. 1 of the drawings shows a vehicle in the form of a truck 10 on which is mounted a container-lifting apparatus 11 constructed according to the invention. The term "vehicle" herein includes trucks, trailers, and other such wheeled means for over-the-road use (i.e., for hauling a load on a roadway). The truck 10 represents all such forms of vehicles, and it is shown in FIGS. 1 and 2 upon a horizontal support surface 12 (e.g., a horizontal road). The truck 10 includes a frame structure 13 (FIG. 1) extending longitudinally along a horizontally disposed, longitudinally extending central axis 14 of the truck 10, with the central axis 14 extending from a forward end 15 of the truck 10 to a rearward end 16 of the truck 10. The apparatus 11 is mounted on the frame structure 13 in the manner stated in this description.

Figure 8:
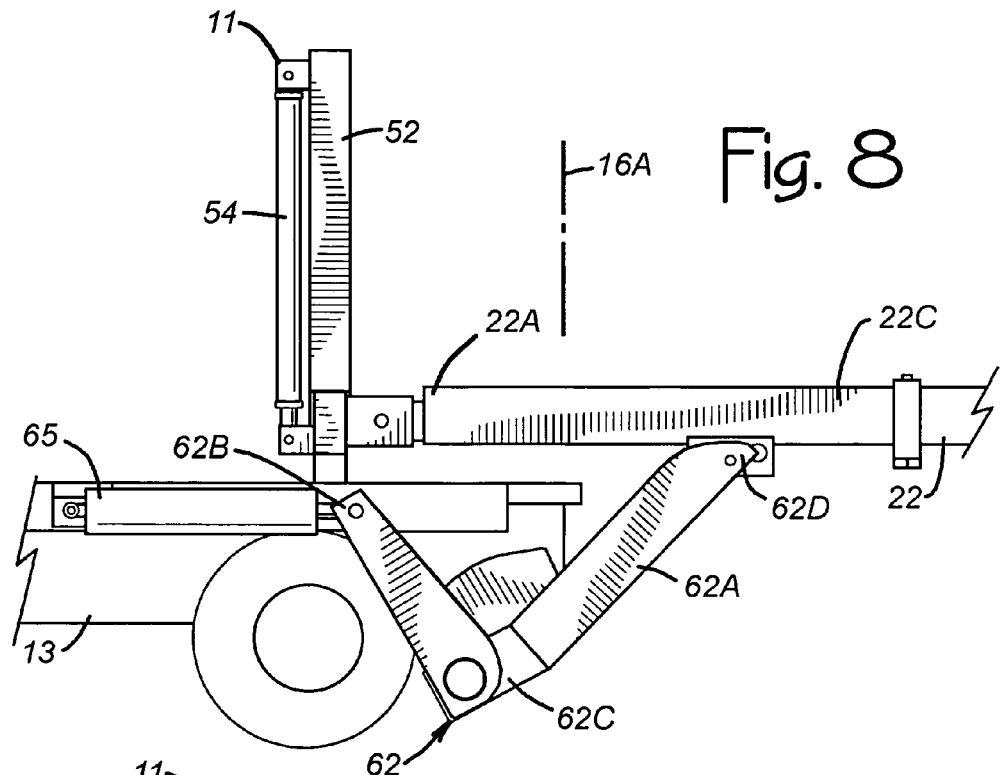
FIG. 8 is an enlarged detail view of a portion of the second beam-supporting arm located on the right side of the truck as viewed from the vertical reference plane identified in FIGS. 2 and 3, with the second beam-supporting arm pivoted upwardly to support the intermediate portion of the second container-engaging beam in a raised position.
Figure 9:
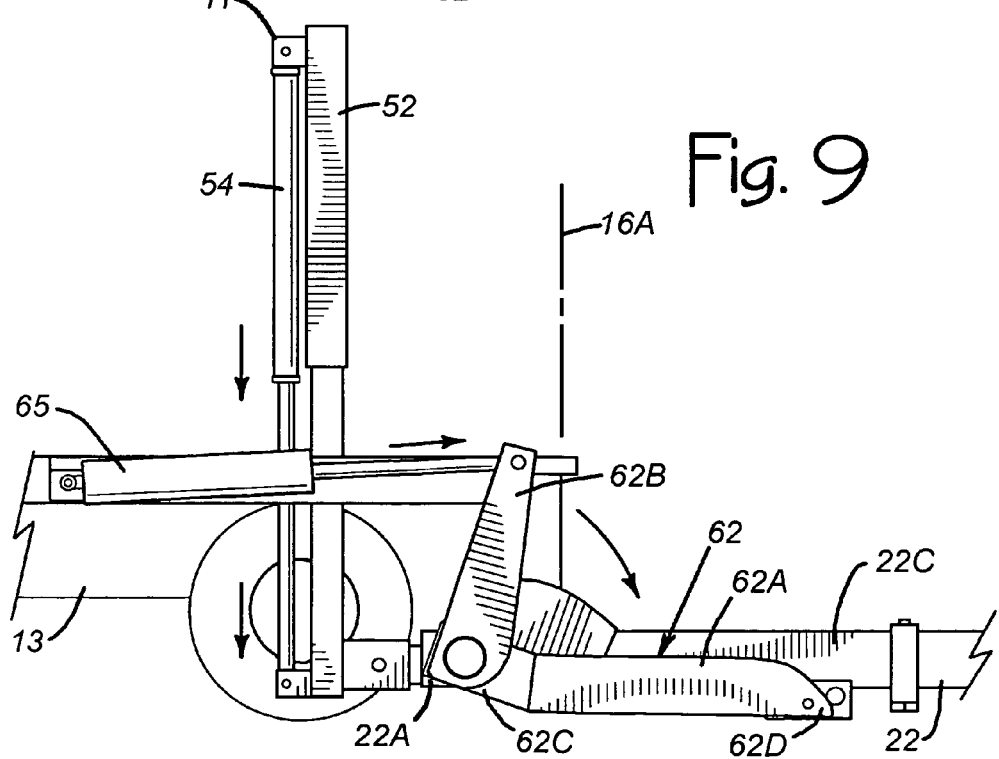
FIG. 9 is an enlarged detail view similar to FIG. 8, but with the second beam-supporting arm pivoted downwardly to support the intermediate portion of the second container-engaging beam in a lowered position.

For convenience in describing various spatial relationships, notice at this point in the description that a vertical reference plane 17 containing the central axis 14 of the truck 10 (e.g., a plane depicted by a broken line 17 in FIGS. 2, 3, and 11) bisects the truck 10 into left and right sides. From the viewpoint of a person standing upright and facing the vehicle 10 from a position behind the rearward end 16, the truck 10 has a left side 18 to the left of the vertical reference plane 17 and a right side 19 to the right of the vertical reference plane 17 (FIG. 2). A secondary vertical reference plane 16A is also identified in FIGS. 8 and 9 by a broken line 16A. The secondary vertical reference plane 16A extends perpendicular to the vertical reference plane 17 at the rearward end 16 of the truck 10.

A first horizontally disposed first container-engaging beam 21 (FIGS. 1, 2, 3, 4, 6, 7, and 10) extends longitudinally on the truck 10 to the left of the reference vertical plane 17. Similarly, a second container-engaging beam 22 (FIGS. 2, 3, 8, 9, and 10) extends longitudinally on the truck 10 to the right of the vertical reference plane 17. The first and second container-engaging beams 21 and 22 are sometimes referred to as "horizontal lifting arms," and also more simply as beams 21 and 22. They are elongated members that function as first and second container-engaging means for engaging opposite sides of a container for container lifting and loading purposes (e.g., opposite sides 23A and 23B of a storage container 23 shown in FIGS. 4, 6, and 10). They are "container-engaging" beams in the sense that they are used with suitable brackets, straps, chains, and/or other equipment to grip and lift a container for loading and unloading. They are suitably strong, rigid members for that purpose. The illustrated container-engaging beams 21 and 22 are, for example, twenty-foot long, rectangular steel tubes measuring about four inches wide and eight inches high. Of course, those dimensions may vary without departing from the inventive concepts disclosed.

The first container-engaging beam 21 has a first proximal end portion 21A, a first distal end portion 21B, and a first intermediate portion 21C extending intermediate the first proximal end portion and the first distal end portion along a first beam axis of elongation 21D. Those details of the first container-engaging beam 21 are identified in FIGS. 1 and 11. Similarly, the second container-engaging beam 22 has a second proximal end portion 22A, a second distal end portion 22B, and a second intermediate portion 22C extending intermediate the second proximal end portion and the second distal end portion along a second beam axis of elongation 22D. Those details of the second container-engaging beam 22 are identified in FIGS. 8 and 11.

The invention includes beam-holding means on the truck 10 for holding the first and second proximal end portions 21A and 22A of the beams 21 and 22 forward of the rearward end 16 of the truck 10 for operator-controlled movement of the first and second proximal end portions 21A and 22A vertically, laterally, and longitudinally. Operator-controlled movement proceeds with the first beam axis of elongation 21D (FIGS. 1 and 11) disposed horizontally to the left of and parallel to the vertical reference plane 17 identified in FIGS. 2 and 3, and with the second beam axis of elongation 22D (FIG. 11) disposed horizontally to the right of and parallel to the vertical reference plane 17.

In terms of some of the claim language, the above broadly stated function of the beam-holding means is accomplished with first, second, and third beam-moving means. The first beam-moving means is supported by the truck 10 on rails to be described below and it serves the function of supporting and moving the second beam-moving means longitudinally; it moves the second beam-moving means (and thereby the first and second proximal end portions 21A and 21B of the first and second beams 21 and 22) longitudinally, parallel to the central axis 14, under operator control. The second beam-moving means is supported by the first beam-moving means and it serves the function of supporting and moving the third beam-moving means laterally; it moves the third beam-moving means (and thereby the first and second proximal end portions 21A and 21B) laterally (i.e., perpendicular to the vertical reference plane 17) under operator control. The third beam-moving means is supported by the second beam-moving means and it serves the function of holding (supporting) and moving the first and second proximal end portions 21A and 21B vertically; it moves the first and second proximal end portions vertically (i.e., parallel to the vertical reference plane 17) under operator control.

The illustrated container-lifting apparatus 11 accomplishes the function of the first beam-moving means using a longitudinally moveable, steel carrier assembly 30 on the truck 10 (FIGS. 1, 3, 4, and 11). The carrier assembly 30 functions as means for carrying other components as it travels longitudinally under operator control. It is a longitudinally moveable carrier assembly mounted moveably on the pair of spaced-apart rails for longitudinal movement under operator control. The illustrated carrier assembly 30 is mounted moveably on the truck 10 using a pair of spaced-apart, C-shaped, steel channels that are identified in FIGS. 3 and 11 as first and second rails 31 and 32 (also called "trolley rails"). Steel rollers 30A, 30B, 30C, and 30D on the carrier assembly 30 (FIGS. 3, 5, and 10) sit atop the first and second rails 31 and 32 (i.e., atop upwardly facing aspects of the first and second rails), with the carrier assembly 30 providing a moveable platform that rolls along the first and second rails 31 and 32 longitudinally under operator-controlled hydraulic power.

Figure 10:
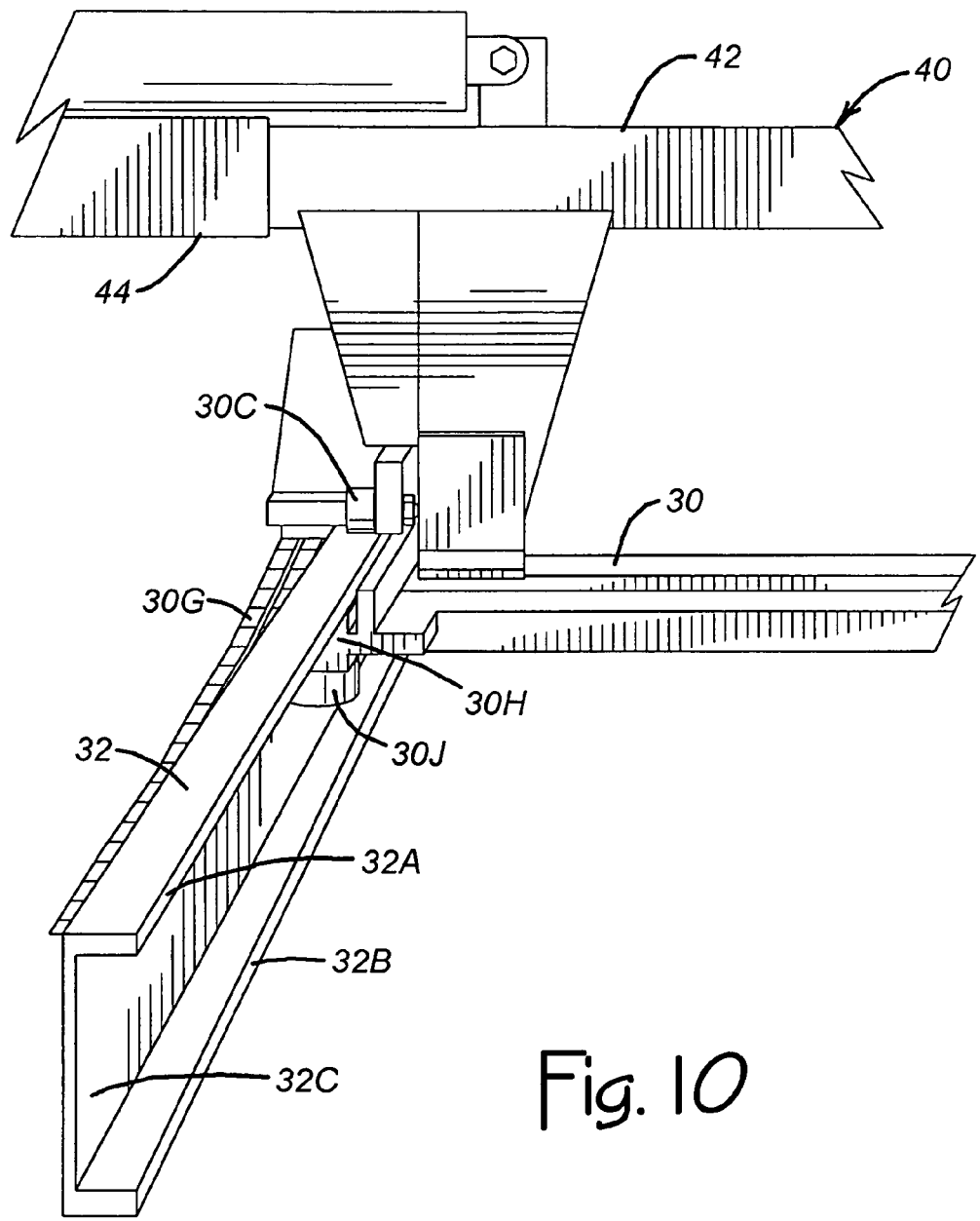
FIG. 10 is an enlarged detail view of a portion of the carrier assembly and a portion of the left rail viewed from behind the truck, showing carrier assembly structure extending beneath the upper horizontal portion of the C-shaped rail for purposes of preventing upward movement of the carrier assembly.

Preferably, additional rollers are provided on the carrier assembly 30 that bear upwardly and sideways against the first and second rails 31 and 32 in order to restrict upward and sideways movement of the carrier assembly 30 relative to the first and second rails 31 and 32. Additional upward-movement-restricting carrier structure 30H is shown in FIG. 10 extending beneath an upper horizontal portion 32A of the C-shaped second beam 32. An additional sideways-movement-restricting roller 30J is also shown in FIG. 10, disposed between the upper horizontal portion 32A and a lower horizontal portion 32B of the beam 32 where it bears laterally outward against an inwardly facing aspect of a mid portion 32C of the C-shaped beam 32.

With regard to rail mounting, each of the illustrated first and second rails 31 and 32 is mounted on the truck 10 by suitable means, such as, for example, welding a lower horizontal portion of each C-shaped rail to a separate mounting plate (not shown) and then bolting the mounting plates to the truck frame, with the first and second rails 31 and 32 oriented as illustrated and spaced eighteen inches from the vertical reference plane 17 (i.e., 36 inches between rails). So mounted, the rails 31 and 32 extend longitudinally on the truck 10 (i.e., parallel to the vertical reference plane 17) with the carrier assembly 30 providing a platform that rolls along the first and second rails 31 and 32 longitudinally.

Figure 4:
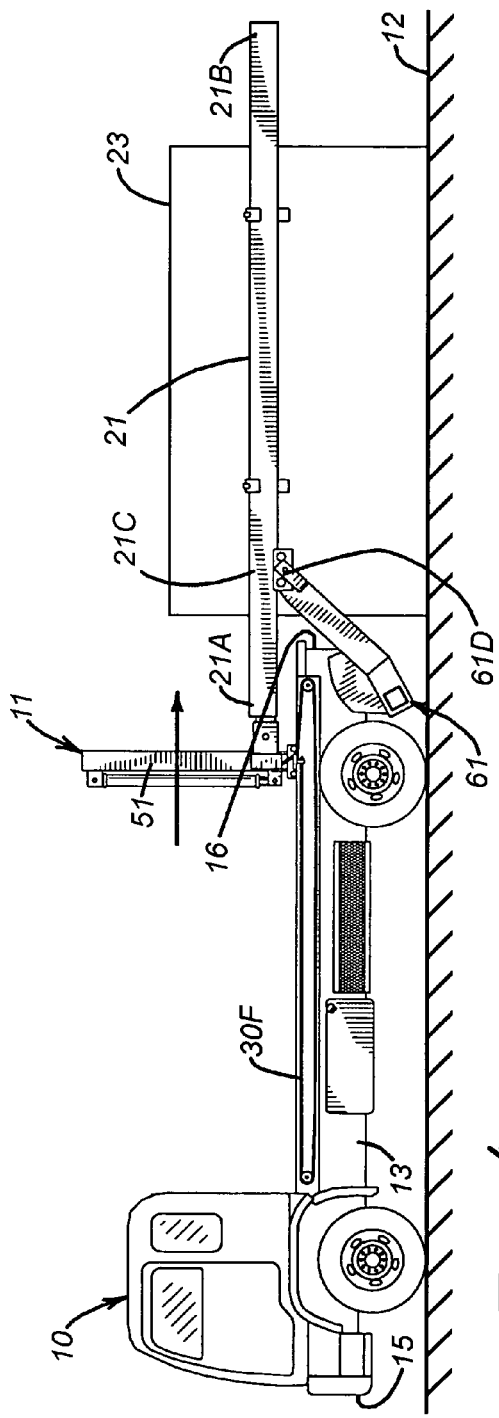
FIG. 4 is a side elevation view of the left side of the truck that is reduced in scale, showing a container at the rearward end of the truck and the container-engaging beams deployed rearwardly.
Figure 5:
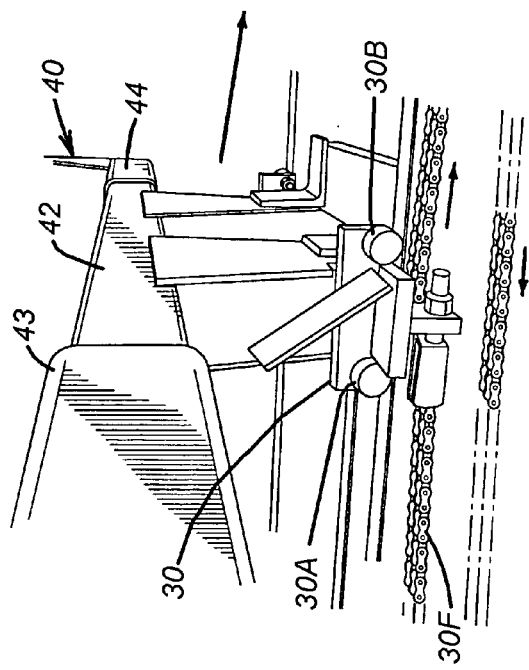
FIG. 5 is an enlarged detail view of the carrier assembly that moves longitudinally to deploy and retract the container-engaging beams.
Figure 11:
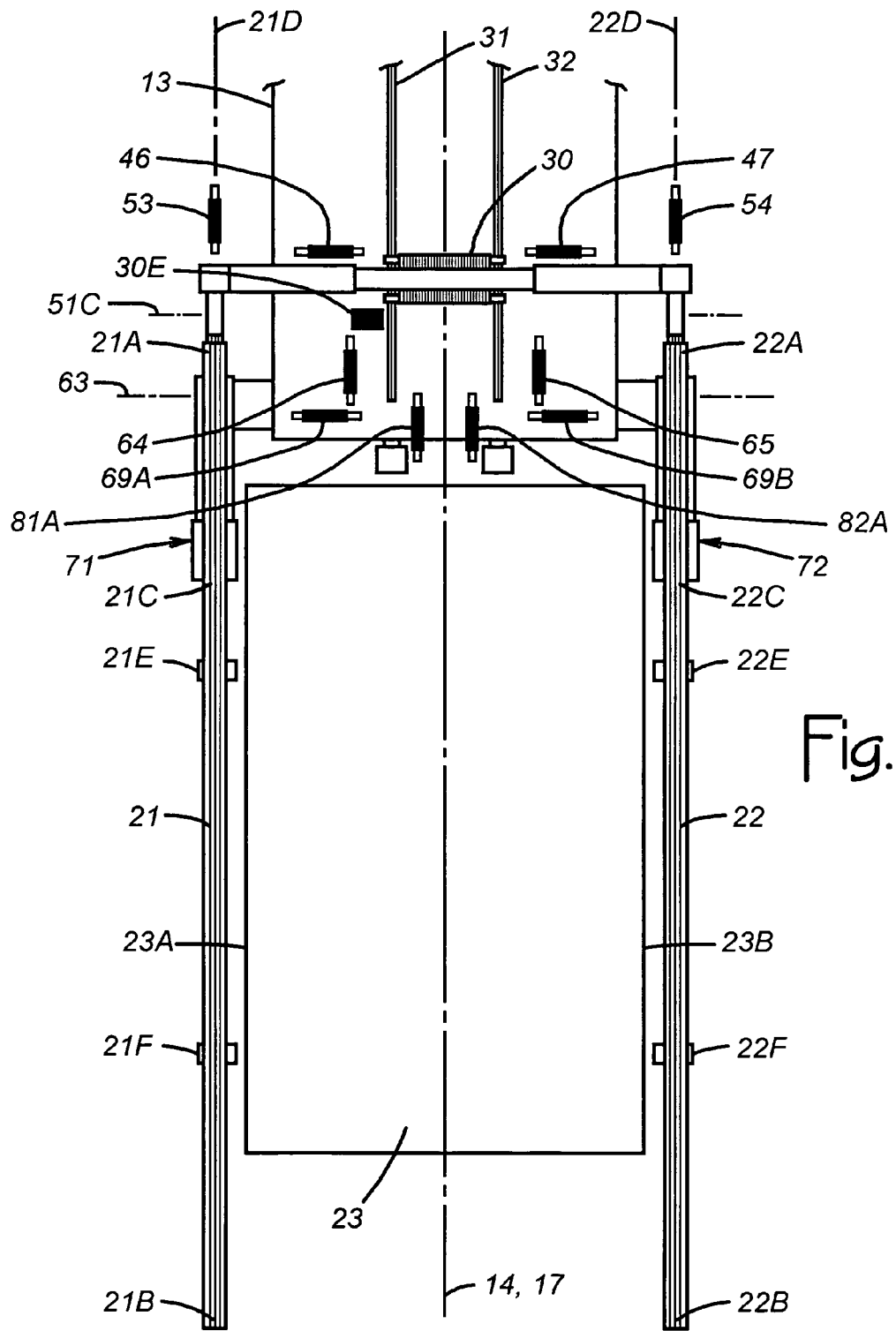
FIG. 11 is a diagrammatic representation of the truck and container-lifting apparatus in position to load a container located behind the truck, all as viewed from a position above the truck, with the beams shown fully deployed rearwardly next to opposite sides of the container and with the various hydraulic components of the apparatus identified, including the ten hydraulic cylinder assemblies and the one hydraulic motor.

Concerning powering of the carrier assembly 30, it rolls along the rails under operator-controlled power provided by a hydraulic motor 30E that is identified in FIG. 11. The hydraulic motor 30E converts hydraulic pressure to rotational movement that drives first and second chains 30F and 30G connected to the carrier assembly 30. The first chain 30F extends alongside the first rail 31 on the left of the vertical reference plane 17 (FIG. 4). The second chain 30G extends alongside the second rail 32 on the right of the vertical reference plane 17 (FIG. 10). The chain drive motor for the dual chains 30F and 30G (i.e., the hydraulic motor 30E) may be located various places, including at the center of the beam-holding assembly to be discussed later on in this description. Based upon the foregoing and subsequent descriptions, one of ordinary skill in the art can readily implement a carrier assembly for use in a container-lifting apparatus constructed according to the invention.

Next, consider the function of the second beam-moving means. It serves the function of supporting and moving the third beam-moving means laterally. It moves the third beam-moving means (and thereby the first and second proximal end portions 21A and 21B) laterally (i.e., perpendicular to the vertical reference plane 17) under operator control. The illustrated container-lifting apparatus 11 accomplishes the function of the second beam-moving means using a laterally adjustable cross-arm assembly 40 extending along a cross-arm axis of elongation 41 (FIGS. 3, 10 and 11) that is perpendicular to the vertical reference plane 17.

The illustrated cross-arm assembly 40 includes a mid section 42 attached to the carrier assembly 30, a first laterally moveable section 43 to the left of the vertical reference plane 17, and a second laterally moveable section 44 to the right of the vertical reference plane 17. The mid section 42 is attached to the carrier assembly 30 in a position such that the mid section 42 extends across the vertical reference plane 17, while the first and second sections 43 and 44 are attached to opposite sides of the mid section 42 moveably; they are so attached for lateral movement of the first section 43 parallel to the cross-arm axis of elongation 41 and to the left of the vertical reference plane 17, and for lateral movement of the second section 44 parallel to the cross-arm axis of elongation 41 and to the right of the vertical reference plane 17. First and second cross-arm-moving hydraulic cylinder assemblies 46 and 47 (FIGS. 3 and 11) are operationally connected to the cross-arm components to move the first and second sections 43 and 44 relative to the mid section 42 under operator control. They are operationally connected in the sense that they are connected to function as described.

Preferably, the three components 42, 43, and 44 are connected together telescopingly, centered on the cross-arm axis of elongation 41, "telescopingly" referring to one component being partially disposed slidably and coaxially within another for relative movement of each axially. In a telescoping configuration, for example, the mid section 42 is attached fixedly to the carrier assembly 30, while the first and second sections 43 and 44 extending telescopingly from the mid section 42, for lateral movement relative to the mid section 42 under operator control. For telescoping purposes, the illustrated mid section 42 may be fabricated from a length of commercially available 4-inch square hollow steel tubing, with the first and second sections 43 and 44 being fabricated from lengths of commercially available 5-inch square hollow steel tubing.

Figure 3:
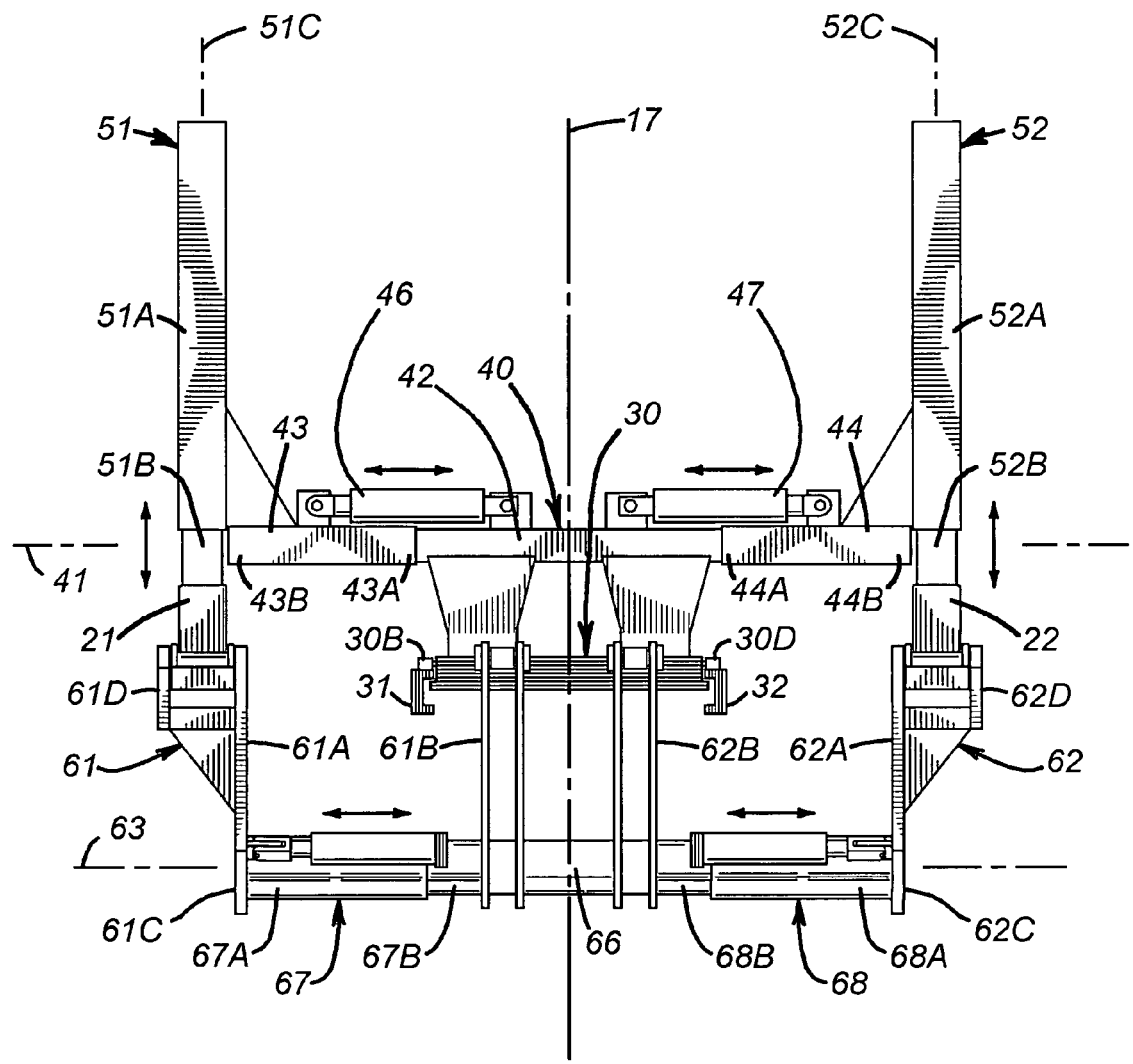
FIG. 3 is a diagrammatic representation of the beam-holding assembly and the beam-supporting arms that enable operator-controlled movement of the container-engaging beams.

A first inward end portion 43A of the first section 43 slides telescopingly over the mid section 42 to the left of the vertical reference plane 17, while a second inward end portion 44A of the second section 44 slides telescopingly over the mid section 42 to the right of the vertical reference plane 17 (e.g., as illustrated in FIG. 3). In operation, the first and second sections 43 and 44 are moved telescopingly that way along the cross-arm axis of elongation 41 (i.e., laterally) under operator control to operator-desired positions of a first outward end 43B of the first section 43 and a second outward end 44B of the second section 44. From the foregoing and subsequent descriptions, one of ordinary skill in the art can readily implement second beam-moving means for a container-lifting apparatus constructed according to the invention.

The third beam-moving means serves the function of moving the first and second proximal end portions 21A and 22A of the first and second beams 21 and 22 vertically under operator control, parallel to the vertical reference plane 17. The illustrated container-lifting apparatus 11 accomplishes the function of the third beam-moving means using two vertically adjustable post assemblies 51 and 52 (FIG. 3). The first vertically adjustable post assembly 51 has a first upper section 51A that is connected to the first outward end 43B of the first laterally moveable section 43 and a first lower section 51B that is connected moveably to the first upper section 51A for vertical movement relative to the first upper section 51A parallel to a vertically disposed first post axis of elongation 51C. Similarly, the second vertically adjustable post assembly 52 has a second upper section 52A that is connected to the second outward end 44B of the second laterally moveable section 44 and a second lower section 52B that is connected moveably to the second upper section 52A for vertical movement relative to the second upper section 52A parallel to a vertically disposed second post axis of elongation 52C.

Preferably, the first and second post assemblies 51 and 52 are telescoping components also, with the first lower section 51B of the first post assembly 51 sliding coaxially into the first upper section 51A, and the second lower section 52B of the second post assembly 52 sliding coaxially into the second upper section 52A. The first and second post assemblies 51 and 52 may, for example, be fabricated of telescoping steel tubes in a manner similar to the telescoping cross-arm fabrication mentioned above. A first post-moving hydraulic cylinder assembly 53 (FIGS. 6 and 11) is operationally connected to move the first lower section 51B relative to the first upper section 51A under operator control. Similarly, a second post-moving hydraulic cylinder assembly 54 (FIGS. 8, 9, and 11) is operationally connected to move the second lower section 52B relative to the second upper section 52A.

Vertical, lateral, and longitudinal post movement results in movement of the first and second beams 21 and 22 accordingly. The first proximal end portion 21A of the first beam 21 is connected to the first lower section 51B of the first assembly 51, and the second proximal end portion 22A of the second beam 22 is connected to the second lower section 52B of the second post assembly 52. As a result, vertical movement of the first and second lower sections 51B and 52B moves the first and second proximal end portions 21A and 22A vertically. That movement combines with lateral movement of the first and second outer ends 43B and 44B of the cross-arm assembly 40 to move the first and second proximal end portions 21A and 22A laterally, and longitudinal movement of the carrier assembly 30 to move them longitudinally. In other words, operating the first and second post-moving hydraulic cylinder assemblies 53 and 54 causes those cylinder assemblies and the beams 21 and 22 to move vertically as depicted by the vertically disposed arrows in FIGS. 3 and 9, while operating the hydraulic cylinder assemblies 46 and 47 (FIG. 3) causes those cylinder assemblies and the beams 21 and 22 to move laterally as depicted by the horizontally disposed arrows shown above the cylinder assemblies 46 and 47 in FIG. 3.

Preferably, the first and second proximal end portions 21A and 21B are connected to the first and second lower sections 51B and 52B pivotally, for pivotal movement of the first and second beams 21 and 22 about a proximal end pivotal axis 51C that extends perpendicular to the vertical reference plane 17. The proximal end pivotal axis 51C is identified in FIG. 11. The ability of the operator to pivot the first and second beams 21 and 22 about the proximal end pivotal axis 51C enables some operator adjustment of beam inclination when needed for container-loading purposes. In operation, the operator moves the carrier assembly 30 longitudinally, adjusts the cross-arm assembly 40 laterally, and adjusts the first and second post assemblies 51 and 52 vertically to thereby move the first and second proximal end portions of the first and second beams 21 and 22 as desired. This is done in concert with movement of the first and second intermediate portions 21C and 22C by similar first and second beam-supporting assemblies 61 and 62 on the truck 10 as will be described below. From the foregoing and subsequent descriptions, one of ordinary skill in the art can readily implement beam-holding means that includes first, second, and third beam-moving means as described above for use in a container-lifting apparatus constructed according to the present invention.

A container-lifting apparatus constructed according to the present invention includes beam-supporting means on the vehicle for supporting the first and second intermediate portions of the first and second beams rearward of the rearward end of the vehicle. That is done in a way enabling operator-controlled positioning of the first and second intermediate portions vertically and laterally in concert with movement of the first and second proximal end portions (i.e., coordinated movement) in order to achieve operator-desired beam orientations for container-loading purposes. The illustrated container-lifting apparatus 11 accomplishes the function of the beam-supporting means using the two beam-supporting assemblies 61 and 62 on the truck 10 that were mentioned above. The first beam-supporting assembly 61 is identified in FIGS. 1, 2, 3, 4, 6, and 11, disposed to the left of the vertical reference plane 17 (i.e., the reference plane identified in FIGS. 2, 3, and 11) where it extends rearwardly from the truck 10 past the rearward end 16 of the truck 10 (i.e., rearwardly past the secondary reference plane 16A) to the first intermediate portion 21C of the first beam 21. The second beam-supporting assembly 62 is identified in FIGS. 7, 8, 9, and 11, disposed to the right of the vertical reference plane 17 where it extends rearwardly from the truck 10 past the rearward end 16 of the truck 10 to the first intermediate portion 21C of the first beam 21.

The first and second beam-supporting assemblies 61 and 62 are similar in many respects. They are mounted on the truck 10 for pivotal movement about an arm assembly pivotal axis 63 that extends transversely across the truck 10, perpendicular to the vertical reference plane 17, as shown in FIG. 11. The first beam-supporting assembly 61 includes a first arm 61A and a first crank member 61B (FIG. 3), along with a first crank-moving hydraulic cylinder assembly 64 (FIG. 11) that moves the first crank member 61B (and thereby the first arm 61A) pivotally about the pivotal axis 63 under operator control. Similarly, the second beam-supporting assembly 62 includes a second arm 62A and a second crank member 62B (FIGS. 3, 8, 9, and 11), along with a second crank-moving hydraulic cylinder assembly 65 (FIGS. 8, 9, and 11) that moves the second crank member 62B (and thereby the second arm 62A) pivotally about the arm assembly pivotal axis 63 under operator control. Movement of the cylinder assemblies 64 and 65 as depicted for the cylinder assembly 65 by a horizontally disposed arrow in FIG. 9, results in pivotal movement as depicted by a curved arrow for the second beam-supporting arm assembly 62 in FIG. 9.

The first arm 61A of the first beam-supporting assembly 61 includes a first arm proximal end portion 61C (FIG. 3) that is connected to the first crank arm 61B, and a first arm distal end portion 61D (FIGS. 3, 4, 6, and 11) that slidably engages and supports the first intermediate portion 21C of the first beam 21 rearward of the rearward end 16 of the truck 10. Similarly, the second arm 62A includes a second arm proximal end portion 62C (FIGS. 3, 8, and 9) that is connected to the second crank arm 62B, and a second arm distal end portion 62D (FIGS. 7, 8, 9, and 11) that slidably engages and supports the second intermediate portion 22C of the second beam 22 rearward of the rearward end 16 of the truck 10. In operation, the operator actuates the first and second crank-moving hydraulic cylinder assemblies 64 and 65 in order to pivot the first and second crank members 61B and 62B and thereby pivot the first and second arms 61A and 62A. As the operator pivots the first and second arms 61A and 62A that way, the first and second distal end portions 61D and 62D slide longitudinally along the first and second intermediate portions 21C and 22C of the first and second beams 21 and 22, providing upward support to the first and second intermediate portions 21C and 62C of the first and second beams 21 and 22 as they do so while maintaining the beams level.

Preferably, the first and second arm distal end portions 61D and 62D include first and second beam-engaging structures 71 and 72 (FIG. 11) that facilitate sliding engagement of the first and second intermediate portions 21C and 22C of the first and second beams 21 and 22. The first and second beam-engaging structures 71 and 72 are generally similar, and so only the second beam-engaging structure 72 is described in further detail with reference to FIG. 7. The second beam-engaging structure 72 includes a housing 73 (e.g., a pad or base structure) that is mounted pivotally on the second arm distal end portion 62D. Preferably, a pair of rollers 74 and 75 are mounted rotatably on the housing 73 in positions such that the rollers bear upwardly against the downwardly facing aspect of the second beam. That occurs with the housing 73 overlapping the inwardly facing aspect of the second beam 22 (i.e., that aspect of the beam facing laterally toward the vertical reference plane 17) and the outwardly facing aspect of the second beam 22 (i.e., that aspect of the beam facing laterally away from the vertical reference plane 17) for purposes of restricting lateral movement of the second intermediate portion 21C of the second beam 22. As the second arm structure 62A pivots, the second beam-engaging structure 72 moves along the second beam longitudinally, with the rollers 74 and 75 to facilitating that longitudinal (sliding) movement. The second beam-engaging structure 72 is said to slidably engage the second beam 22 in the sense that it operates as described above, with or without rollers facilitating that operation, moving longitudinally beneath the second beam 72 while bearing upwardly against the beam 22 and, preferably, while restricting lateral movement.

Any of various pivotal mounting means may be employed within the broader inventive concepts disclosed. Preferably, the illustrated first and second crank members 61B and 62B are mounted pivotally on a central structure 66 attached to the truck 10, for hydraulically powered, operator-controlled, pivotal movement about the arm assembly pivotal axis 63. That central structure 66 is identified in FIG. 3. Lateral adjustability is provided also. The first arm 61A is connected to the first crank member 61B by a laterally adjustable, telescoping first axle member 67 that includes a first outward axle member 67A and a first inward axle member 67B (FIG. 3). Similarly, the second arm 62A is connected to the second crank member 62B by a laterally adjustable, telescoping second axle member 68 that includes a first outward axle member 68A and a first inward axle member 68B (FIG. 3).

More particularly, the first outward axle member 67A of the illustrated apparatus 11 takes the form of a square steel tube (e.g., 5-inch square) centered on the pivotal axis 63. It is attached rigidly to the first arm proximal end portion 61C. The first inward axle member 67B is a square steel tube also, but of smaller dimensions (e.g., 4-inch square), and it extends coaxially from within the first outward axle member 67B to the first crank member 61B where it is attached rigidly to the first crank member 61B for pivotal movement about the arm assembly pivotal axis 63 with the first crank member 61B. Similarly, the second outward axle member 68A is a square steel tube that is centered on the pivotal axis 63 and attached rigidly to the second arm proximal end portion 62C. The second inward axle member 68B is a square steel tube of smaller dimensions that extends coaxially from within the second outward axle member 68B to the second crank member 62B where it is attached rigidly to the first crank member 62B for pivotal movement about the arm assembly pivotal axis 63 with the first crank member 62B. Operator actuation of first and second axle-moving hydraulic cylinder assemblies 69A and 69B (FIG. 11) causes the first and second axle members 67 and 68 to move laterally as desired. Based upon the foregoing and subsequent descriptions, one of ordinary skill in the art can readily implement pivotable and laterally adjustable beam-supporting assemblies for a container-lifting apparatus constructed according to the present invention.

Thus, the beam-supporting assemblies 61 and 62 provide operator controlled pivotal movement of the first and second beam supporting arms 61A and 62A that adjusts upward support of the first and second intermediate portions 21C and 22C of the first and second beams 21 and 22. Preferably, the distal end portions extend rearward no further than a maximum of about ten feet or so for this purpose when the beams 21 and 22 are in the lower position shown in FIG. 6. In addition, the beam-supporting assemblies 61 and 62 provide operator controlled lateral adjustment of the first and second arm proximal end portions 61C and 62C under operator control. As a result, the operator can pivot the first and second arms 61A and 62A while moving the first and second proximal end portions 21A and 21B of the beams 21 and 22 with the vertically adjustable posts 51 and 52 described earlier, in order to thereby maintain the first and second beams 21 and 22 level. In addition, the operator can move the proximal end portions 61C and 62C laterally along the pivotal axis 63 as the operator moves the first and second proximal end portions 21A and 21B of the first and second beams 21 and 22 laterally along the cross-arm axis of elongation 41, in order to thereby maintain the first and second beams 21 and 22 parallel to the vertical reference plane 17.

With further regard to the first and second beams 21 and 22, they preferably include moveable container-engaging brackets 21E, 21F, 22E, and 22F mounted moveably on the first and second beams 21 and 22. Those brackets are identified in FIG. 11. The operator uses them during container loading and unloading to engage the container. Additionally, the apparatus 11 preferably includes first and second outrigger assemblies 81 and 82 (FIG. 2) that are mounted at the rearward end of the truck for helping support and brace the truck 10 during loading and unloading operations. The first outrigger assembly 81 is disposed to the left of the vertical reference plane 17 and it includes a first outrigger hydraulic cylinder assembly 81A. The second outrigger assembly 82 is disposed to the right of the vertical reference plane 17 and it includes a second outrigger hydraulic cylinder assembly 82A. The operator actuates the first and second hydraulic assemblies 81A and 82A to deploy and retract the first and second outrigger assemblies 81 and 82 as desired, as depicted in FIG. 2 by the vertically disposed arrows alongside the first and second outrigger hydraulic cylinder assemblies 81A and 82A.

Figure 12:
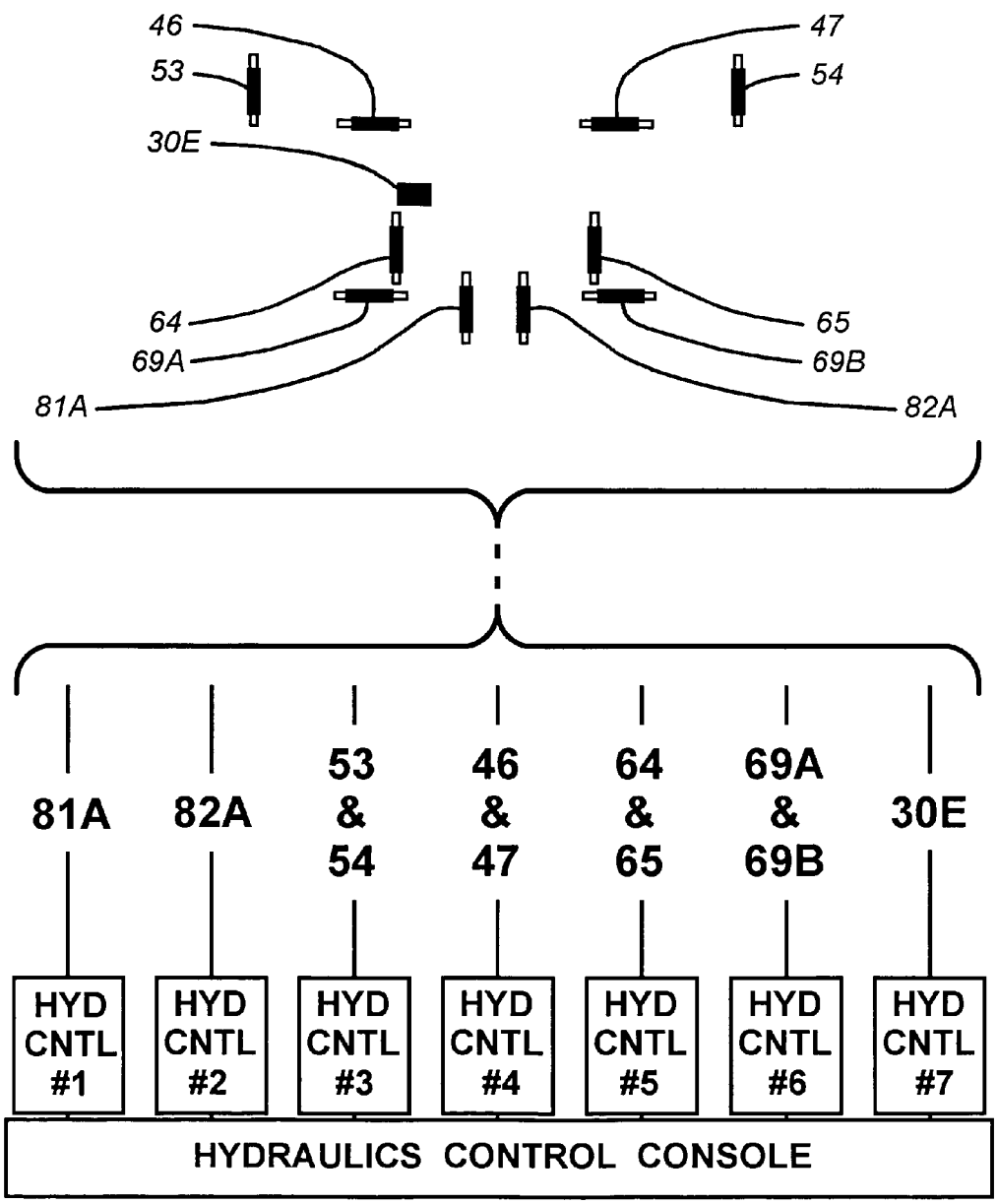
FIG. 12 is a diagrammatic representation of the hydraulic controls that an operator manipulates to control the hydraulic cylinder assemblies identified in FIG. 11, thereby to move the first and second container-engaging beams for container-lifting and loading purposes.

FIGS. 11 and 12 provide additional information about the hydraulics. For illustrative purposes, the ten hydraulic cylinder assemblies shown diagrammatically in FIG. 11 are redrawn diagrammatically in FIG. 12 without the other structural components of the apparatus 11. In addition, FIG. 12 shows the various hydraulic controls diagrammatically at a hydraulic control console mounted on the frame 13 of the truck 10. Each of the hydraulic controls includes a hydraulic valve and valve-actuation lever arrangement. The operator manipulates each of those seven hydraulic controls to control the hydraulic cylinder assemblies associated with each. Each hydraulic cylinder association is illustrated immediately above the box representing the associated control.

Beginning with the first hydraulic control (HYD CNTL #1) in FIG. 12, it controls the first hydraulic cylinder assembly 81A for the first outrigger assembly 81. The first hydraulic cylinder assembly 81A is operationally connected between the frame 13 of the truck 10 and a downwardly moveable component of the first outrigger assembly 81. Similarly, the second hydraulic control (HYD CNTL #2) in FIG. 12 controls the second hydraulic cylinder assembly 82A for the second outrigger assembly 82. The second hydraulic cylinder assembly 82A is operationally connected between the frame 13 of the truck 10 and a downwardly moveable component of the second outrigger assembly 82. The operator manipulates HYD CNTL #1 and HYD CNTL #2 to control the first and second outrigger assemblies 81 and 82 as desired. Of course, one of ordinary skill in the art can readily gang various ones of the hydraulic controls for operation in parallel so that the beams move together.

Next, the third hydraulic control (HYD CNTL #3) in FIG. 12 controls both the first and the second post-moving hydraulic cylinder assemblies 53 and 54 of the first and second vertically adjustable post assemblies 51 and 52. The first post-moving hydraulic cylinder assembly 53 is operationally connected between the first upper section 51A and the first lower section 51B of the first vertically adjustable post assembly 51. The second post-moving hydraulic cylinder assembly 54 is operationally connected between the second upper section 52A and the second lower section 52B of the second vertically adjustable post assembly 52. The operator manipulates HYD CNTL #3 to control vertical movement of the first and second vertically adjustable post assemblies 51 and 52 in order to thereby control vertical movement of the first and second proximal end portions 21A and 21B of the first and second beams 21 and 22.

The fourth hydraulic control (HYD CNTL #4) in FIG. 12 controls both the first and the second cross-arm-moving hydraulic cylinder assemblies 46 and 47 of the laterally adjustable cross-arm assembly 40. The first cross-arm-moving hydraulic cylinder assembly 46 is operationally connected between the mid section 42 and the first laterally moveable section 43. The second cross-arm-moving hydraulic cylinder assembly 57 is operationally connected between the mid section 42 and the second laterally moveable section 44. The operator manipulates HYD CNTL #4 to control lateral movement of the first and second laterally moveable sections 42 and 43 in order to thereby control lateral movement of the first and second proximal end portions 21A and 21B of the first and second beams 21 and 22.

The fifth hydraulic control (HYD CNTL #5) in FIG. 12 controls both the first and the second crank-moving hydraulic cylinder assemblies 64 and 65 of the first and second beam-supporting assemblies 61 and 62. The first crank-moving hydraulic cylinder assembly 64 is operationally connected between the frame 13 of the truck 10 and the first crank member 61B. The second crank-moving hydraulic cylinder assembly 65 is operationally connected between the frame 13 and the second crank member 62B. The operator manipulates HYD CNTL #5 to control pivotal movement of the first and second crank members 61B and 62B in order to thereby control longitudinal movement of the first and second distal end portions end portions 61D and 62D of the first and second beam-supporting arms 61A and 62A along the first and second intermediate portions 21C and 22C of the first and second beams 21 and 22.

The sixth hydraulic control (HYD CNTL #6) in FIG. 12 controls both the first and the second axle-moving hydraulic cylinder assemblies 69A and 69B of the first and second beam-supporting assemblies 61 and 62. The first axle-moving hydraulic cylinder assembly 69A is operationally connected between the first outward axle member 67A and the frame 13 of the truck 10. The second axle-moving hydraulic cylinder assembly 69B is operationally connected between the second outward axle member 68A and the frame 13. The operator manipulates HYD CNTL #6 to control lateral movement of the first and second outward axle members 67A and 68A in order to thereby control lateral movement of the first and second distal end portions end portions 61D and 62D of the first and second beam-supporting arms 61A and 62A, which, in turn, controls lateral movement of the first and second intermediate portions 21C and 22C of the first and second beams 21 and 22.

The seventh hydraulic control (HYD CNTL #7) in FIG. 12 controls the hydraulic motor 30E that drives the dual chains 30F and 30G, and thereby the carrier assembly 30. The hydraulic motor 30E is operationally connected to the dual chains 30F and 30G. The operator manipulates HYD CNTL #7 to control longitudinal movement of the carrier assembly 30 along the first and second rails 31 and 32 in order to thereby control longitudinal movement of the first and second proximal end portions 21A and 22A of the first and second beams 21 and 22. From the foregoing and subsequent descriptions, one of ordinary skill in the art can readily implement the hydraulics for a container-lifting apparatus constructed according to the present invention.

In terms of the methodology, the present invention provides a method for loading and unloading a container onto and from a truck, trailer, or other wheeled vehicle. The vehicle has a forward end, a rearward end, and a central axis extending horizontally from the forward end to the rearward end. The method loads and unloads the container using two parallel, horizontally disposed, container-engaging beams. A first beam has a first proximal end portion, a first distal end portion, and a first intermediate portion extending intermediate the first proximal end portion and the first distal end portion along a first beam axis of elongation. A second beam has a second proximal end portion, a second distal end portion, and a second intermediate portion extending intermediate the second proximal end portion and the second distal end portion along a second beam axis of elongation.

The method includes the steps of providing beam-holding and beam-supporting assemblies on the vehicle as described above. The method proceeds by:
 (a) holding the first and second proximal end portions of the first and second beams forward of the rearward end of the vehicle with the beam-holding assembly so that the first beam axis of elongation is disposed horizontally to the left of and parallel to a vertical reference plane containing the central axis, so that the second beam axis of elongation is disposed horizontally to the right of and parallel to the vertical reference plane, and so that the first and second intermediate portions extending rearward of the rearward end of the vehicle;
 (b) moving the first and second proximal end portions of the first and second beams in order to move the beams into engagement of the container (i.e., into a position adjacent to the container in which the beams can be tied to or otherwise brought into engagement of the container for container-lifting purposes), in order to lift the container with the beams, and in order to withdraw the beams and container back onto the vehicle; and
 (c) supporting the first and second intermediate portions of the first and second beams rearward of the rearward end of the vehicle with the beam-supporting assembly while moving the first and second proximal end portions in order to thereby move the first and second intermediate portions vertically and laterally in concert with movement of the first and second proximal end portions in order to achieve operator-desired beam orientations for container-loading purposes.

Typically, the two container-engaging beams 21 and 22 are moved rearwardly to a position adjacent a container as shown in FIG. 4 by moving the carrier assembly 30 rearwardly. In addition, the beams are moved laterally by coordinated lateral movement of the cross-arm assembly 40 and the beam-supporting arm assemblies 61 and 62. Beyond that, the beams are moved vertically downward to the position shown in FIG. 6 by vertical movement of the vertical post assemblies 51 and 52 coordinated with pivotal movement of the first and second beam-supporting arm assemblies 61 and 62. Once in position, the beams are brought into engagement of the container by suitable means, including, for example, using the brackets 21E, 21F, 22E, and 22F shown in FIG. 11 and/or straps and/or chains. Thereafter, the beams are moved vertically and longitudinally in order to withdraw them with the container onto the truck 10. Unloading proceeds in the reverse.

Thus, the invention provides a vehicle-mounted container-lifting apparatus that includes two hydraulically powered, horizontally disposed, rearwardly extending, container-engaging beams held in spaced-apart positions on opposite sides of the vehicle. The operator maneuvers them into engagement of the container and then retracts them with the container. That is done in a matter something like that of a "litter" (i.e., a platform carried manually on two parallel horizontal poles by two or more servants or other porters) except that only proximal end portions are held with the intermediate portions being supported; the distal end portions are not held or supported. A beam-holding assembly on the vehicle holds the proximal end portions of the beams forward of the vehicle's rearward end for operator-controlled movement of the proximal end portions vertically, laterally, and longitudinally, while a beam-supporting assembly supports the intermediate portions of the beams rearward of the vehicle's rearward end for operator-controlled movement of the intermediate portions in concert with movement of the proximal end portions. The intermediate portions and distal end portions extend beyond the beam-assembly cantilever style, without being held or supported.

Although an exemplary embodiment has been shown and described, one of ordinary skill in the art may make many changes, modifications, and substitutions without necessarily departing from the spirit and scope of the invention. The apparatus can, for example, include a flatbed platform for loading small boxes or transporting a vehicle. As for the specific terminology used to describe the exemplary embodiment, it is not intended to limit the invention; each specific term is intended to include all technical equivalents that operate in a similar manner to accomplish a similar purpose or function. For example, the terms "horizontal," "horizontally," "vertical," "vertically," "parallel," "perpendicular," and the like herein include approximations of the stated characteristic.

What is claimed is:

1. An apparatus for loading a container onto a vehicle having a forward end, a rearward end, a central axis extending horizontally from the forward end to the rearward end, and a frame structure, the apparatus comprising:
 first container-engaging means for engaging a first side of the container while the container is located behind the vehicle, including a first beam having a first proximal end portion, a first distal end portion, and a first intermediate portion extending intermediate the first proximal end portion and the first distal end portion along a first beam axis of elongation;

second container-engaging means for engaging a second side of the container opposite the first side of the container while the container is located behind the vehicle, including a second beam having a second proximal end portion, a second distal end portion, and a second intermediate portion extending intermediate the second proximal end portion and the second distal end portion along a second beam axis of elongation;

beam-holding means on the vehicle for holding the first and second proximal end portions of the first and second beams forward of the rearward end of the vehicle for operator-controlled movement of the first and second proximal end portions, and thereby the rest of the first and second beams, vertically down to a vehicle-supporting surface on which the vehicle is disposed, laterally toward each other and laterally away from each other to positions laterally beyond the frame structure of the vehicle so that they can be moved vertically down to the vehicle-supporting surface, and longitudinally toward the container behind the vehicle, with the first beam axis of elongation disposed horizontally to the left of and parallel to a vertical reference plane containing the central axis and the second beam axis of elongation disposed horizontally to the right of and parallel to the vertical reference plane, in order to thereby enable movement of the first and second beams to container-engaging positions alongside the container in which the first and second beams are located downwardly at the vehicle-supporting surface; and beam-supporting means on the vehicle for supporting the first and second intermediate portions of the first and second beams rearward of the rearward end of the vehicle while enabling operator-controlled positioning of the first and second intermediate portions vertically and laterally in concert with movement of the first and second proximal end portions in order to achieve operator-desired beam orientations for container-loading purposes;

wherein the first and second distal end portions and the first and second intermediate portions of the first and second beams are not spanned by rigid structure connected to the first and second beams that would hinder operator-controlled positioning of the first and second beams on opposite sides of the container and operator-controlled lateral movement of the first and second beams toward and away from each other;

wherein the first and second beams do not support wheels of the vehicle that bear against the vehicle-supporting surface on which the vehicle is disposed;

wherein the beam-holding means includes a carrier assembly mounted moveably on the vehicle for moving the first and second proximal end portions of the first and second beams longitudinally parallel to the vertical reference plane under operator control; and wherein the beam-supporting means is attached to the vehicle at the rearward end of the vehicle so that the beam-supporting means remains at the rearward end of the vehicle as the carrier assembly moves forwardly.

2. An apparatus as recited in claim 1, wherein the beam-holding means includes:

first beam-moving means supported by the vehicle for moving the first and second proximal end portions of the first and second beams longitudinally parallel to the vertical reference plane under operator control;

second beam-moving means supported by the first beam-moving means for moving the first and second proximal end portions of the first and second beams laterally perpendicular to the vertical reference plane under operator control toward each other and away from each other to positions laterally beyond the frame structure of the vehicle so that they can be moved vertically down to the vehicle-supporting surface; and third beam-moving means supported by the second beam-moving means for moving the first and second proximal end portions of the first and second beams vertically parallel to the vertical reference plane under operator control.

3. An apparatus as recited in claim 2, wherein the first beam-moving means includes:

a pair of spaced-apart rails on the vehicle, including a first rail extending longitudinally on the vehicle to the left of and parallel to the vertical reference plane and a second rail extending longitudinally on the vehicle to the right of and parallel to the vertical reference plane; and a longitudinally moveable carrier assembly mounted moveably on the pair of spaced-apart rails for longitudinal movement under operator control.

4. An apparatus as recited in claim 3, wherein the second beam-moving means includes:

a laterally adjustable cross-arm assembly extending along a horizontally disposed cross-arm axis of elongation that is perpendicular to the vertical reference plane;

a mid section of the laterally adjustable cross-arm assembly that is attached to the carrier assembly;

a first laterally moveable section of the laterally adjustable cross-arm assembly that extends parallel to the cross-arm axis of elongation to the left of the vertical reference plane between a first inward end portion of the first laterally moveable section and a first outward end portion of the first laterally moveable section, said first inward end portion being connected to the mid section moveably for lateral movement of the first laterally moveable section relative to the mid section under operator control to beyond the frame structure of the vehicle so that the first proximal end portion of the first beam can be moved vertically down to the vehicle-supporting surface;

a second laterally moveable section of the laterally adjustable cross-arm assembly that extends parallel to the cross-arm axis of elongation to the right of the vertical reference plane between a second inward end portion of the second laterally moveable section and a second outward end portion of the second laterally moveable section, said second inward end portion being connected to the mid section moveably for lateral movement of the second laterally moveable section relative to the mid section under operator control to beyond the frame structure of the vehicle so that the second proximal end portion of the second beam can be moved vertically down to the vehicle-supporting surface.

5. An apparatus as recited in claim 4, wherein the first laterally moveable section and the second laterally moveable section extend telescopingly from the mid section.

6. An apparatus as recited in claim 4, wherein the third beam-moving means includes:

a first vertically adjustable post assembly having a first upper section that is connected to the first outward end of the first laterally moveable section and a first lower section that is connected moveably to the first upper section for vertical movement relative to the first upper section, and a second vertically adjustable post assembly having a second upper section that is connected to the second outward end of the second laterally moveable section and a second lower section that is connected moveably to the second upper section for vertical movement relative to the second upper section, wherein the first proximal end portion of the first container-engaging beam is connected to the first lower section of the first vertically adjustable post assembly and the second proximal end portion of the second container-engaging beam is connected to the second lower section of the second vertically adjustable post assembly.

7. An apparatus as recited in claim 6, wherein:

the first lower section of the first vertically adjustable post assembly extends telescopingly from the first upper section;

and the second lower section of the second vertically adjustable post assembly extends telescopingly from the second upper section.

8. An apparatus as recited in claim 1, wherein the beam-supporting means includes:

a first beam-supporting arm on the vehicle to the left of the vertical reference plane, said first beam-supporting arm having a first arm proximal end portion and a first arm distal end portion;

a second beam-supporting arm on the vehicle to the right of the vertical reference plane, said second beam-supporting arm having a second arm proximal end portion and a second arm distal end portion;

first arm mounting means for mounting the first arm proximal end portion of the first beam-supporting arm on the vehicle moveably for hydraulically powered pivotal movement about a common pivotal axis that is perpendicular to the vertical reference plane and hydraulically powered lateral movement along the common pivotal axis, with the first arm distal end portion disposed rearward of the rearward end of the vehicle and connected slidably to the first intermediate portion of the first beam; and second arm mounting means for mounting the second arm proximal end portion of the second beam-supporting arm on the vehicle moveably for hydraulically powered pivotal movement about the common pivotal axis and hydraulically powered lateral movement along the common pivotal axis, with the second arm distal end portion disposed rearward of the rearward end of the vehicle and connected slidably to the second intermediate portion of the first beam.

9. An apparatus as recited in claim 8, wherein the first and second arm mounting means include:

a first crank assembly mounted rotatably on the vehicle to the left of the vertical reference plane for pivotal motion about the common pivotal axis, said first crank assembly including a first crank and a first crank hydraulic cylinder assembly for pivoting the first crank under operator control;

a first axle assembly extending along the common pivotal axis from the first crank to the first arm proximal end portion of the first beam-supporting arm, said first axle assembly including a telescoping axle connecting the first crank to the first arm proximal end portion and a first axle hydraulic cylinder assembly for moving the first arm proximal end portion laterally under operator control;

a second crank assembly mounted rotatably on the vehicle to the right of the vertical reference plane for pivotal motion about the common pivotal axis, said second crank assembly including a second crank and a second crank hydraulic cylinder assembly for pivoting the second crank under operator control; and a second axle assembly extending along the common pivotal axis from the second crank to the second arm proximal end portion of the second beam-supporting arm, said second axle assembly including a telescoping second axle connecting the second crank to the second arm proximal end portion and a second axle hydraulic cylinder assembly for moving the second arm proximal end portion laterally under operator control.

\* \* \* \* \*